US010783196B2

(12) United States Patent
Grehant et al.

(10) Patent No.: US 10,783,196 B2
(45) Date of Patent: Sep. 22, 2020

(54) THEMATIC WEB CORPUS

(71) Applicant: DASSAULT SYSTEMES, Velizy Villacoublay (FR)

(72) Inventors: Xavier Grehant, Colombes (FR); Morgan Champenois, Issy-les-Moulineaux (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 136 days.

(21) Appl. No.: 15/354,870

(22) Filed: Nov. 17, 2016

(65) Prior Publication Data

US 2017/0140055 A1    May 18, 2017

(30) Foreign Application Priority Data

Nov. 17, 2015 (EP) .................................... 15306826

(51) Int. Cl.
| | | |
|---|---|---|
| *G06F 16/00* | (2019.01) | |
| *G06F 16/9535* | (2019.01) | |
| *G06F 16/955* | (2019.01) | |
| *G06F 16/951* | (2019.01) | |
| *H04L 29/08* | (2006.01) | |
| *H04L 29/06* | (2006.01) | |

(52) U.S. Cl.
CPC ........ *G06F 16/9535* (2019.01); *G06F 16/951* (2019.01); *G06F 16/9566* (2019.01); *H04L 67/02* (2013.01); *H04L 67/1097* (2013.01); *H04L 67/42* (2013.01)

(58) Field of Classification Search
CPC .......... G06F 17/30867; G06F 17/30864; G06F 17/30887
See application file for complete search history.

(56) References Cited

U.S. PATENT DOCUMENTS

| | | | | |
|---|---|---|---|---|
| 7,831,609 B1 * | 11/2010 | Alexander | ........ | G06F 17/30887 707/765 |
| 7,958,457 B1 * | 6/2011 | Brandenberg | ........ | G06F 1/1613 715/789 |
| 8,099,405 B2 * | 1/2012 | Vayssiere | .............. | G06F 16/951 707/706 |

(Continued)

OTHER PUBLICATIONS

Silvia Bernardini, The WaCky Wide Web: A Collection of very large linguistically processed web-crawled corpora. p. 1-7 (Year: 2009).*

(Continued)

*Primary Examiner* — Mark D Featherstone
*Assistant Examiner* — Kweku William Halm
(74) *Attorney, Agent, or Firm* — Oblon, McClelland, Maier & Neustadt, L.L.P.

(57) ABSTRACT

The invention notably relates to a computer-implemented method, performed by a server storing an index of a search engine, for sending, to a client, the URLs of pages of a Web corpus that relates to a theme. The method comprises receiving, from the client, a structured query that corresponds to the theme, the structured query consisting of a disjunction of at least one keyword; determining in the index the group that consists of the URLs of all pages that match the query; and sending to the client the URLs of the group as a stream.
Such a method improves the building of a thematic Web corpus.

8 Claims, 5 Drawing Sheets

(56) References Cited

U.S. PATENT DOCUMENTS

| | | | | |
|---|---|---|---|---|
| 8,214,380 | B1* | 7/2012 | Bettinger | G06F 16/9535 707/758 |
| 8,346,755 | B1 | 1/2013 | Kapoor | |
| 8,849,812 | B1* | 9/2014 | Mukherjee | G06F 17/30867 707/728 |
| 2008/0098300 | A1* | 4/2008 | Corrales | G06F 16/951 715/243 |
| 2009/0282022 | A1* | 11/2009 | Bennett | G06F 17/30675 |
| 2009/0287684 | A1 | 11/2009 | Bennett | |
| 2010/0082661 | A1* | 4/2010 | Beaudreau | G06F 17/30867 707/769 |
| 2010/0115060 | A1* | 5/2010 | Julia | G06F 17/30035 709/219 |
| 2010/0161622 | A1* | 6/2010 | Hattori | G06F 17/30867 707/749 |
| 2011/0178868 | A1 | 7/2011 | Garg et al. | |
| 2011/0179077 | A1* | 7/2011 | Pulnikova | G06F 17/30864 707/770 |
| 2014/0081954 | A1* | 3/2014 | Elizarov | H04N 21/252 707/722 |
| 2014/0089090 | A1* | 3/2014 | Thrasher | G06F 17/30864 705/14.54 |
| 2015/0100562 | A1* | 4/2015 | Kohlmeier | G06F 17/3053 707/706 |
| 2016/0070800 | A1* | 3/2016 | Malkin | G06F 17/30321 707/754 |

OTHER PUBLICATIONS

Office Action dated Mar. 8, 2016, in European Patent Application No. 15306826.7-1952.
Marco Baroni, et al.; "The WaCky Wide Web" A Collection of Very Large Linguistically Processed Web-Crawled Corpora; Language Resources and Evaluation, Springer Netherlands, Dordrecht; vol. 43. No. 3; Feb. 10. 2009; pp. 209-226. XP019728443: ISSN: 1574-0218; DOI: 10. 1007/S10579-009-9081-4.
Gregory L. Mclearn; "Autonomous Cooperating Web Crawlers"; pp. 1-106; etd.uwaterloo.ca/etd/glmclearn2002; Retrieved Jul. 23, 2012.
Junghoo Cho, et al.; "Parallel Crawlers"; Proceedings of the 11$^{th}$ International Conference on World Wide Web; May 11, 2002.
International Search Report for EP 12 30 5432 dated Jul. 24, 2012.
Taubes, Gary; "Indexing the Internet"; 269: 1354-1356; Sep. 8, 1995.
Lawrence, et al.; "Accessibility of Information on the Web"; Nature, vol. 400, pp. 107-109; Jul. 8, 1999.
Kobayashi, et al.; "Information Retrieval on the Web": ACM Computing Surveys; vol. 32; No. 2; Jun. 2000.
Jasani, Bhavin M.; "Analyzing Different Web Crawling Methods"; International Journal of Computer Applications (0975-8887); vol. 107—No. 5, Dec. 2014.
Chakrabarti, Soumen; "Mining the Web"; 364 pages; http://read.podn.com/downloads75/ebook/275001/Morgan%20Kaufmann%20%20Mining%20the%20Web%20%-%20Discovering%20Knowledge%20from%20Hypertext%20Data.pdf; Retrieved Sep. 29, 2015.
Chakrabarti, et al.; "Focused Crawling: A New Approach to Topic-Specific Web Resource Discovery"; 18 pages; http://web.archive.org/web/20040317210216/http://fxpal.com/people/ydberg/pubs/www8/www1999f.pdf; Retrieved Sep. 29, 2015.
Novak, Blaz; "A Survey of Focused Web Crawling Algorithms"; Proceedings of SIKDD 5558 (2004).
Baroni, Marco; "A Quick Guide to Building Your Own Specialized Corpus From The Web"; 6 pages; http://sslmit.unibo.it/-dsmiraglio/procedura_BootCat.html; Retrieved Sep. 29, 2015.
U.S. Appl. No. 13/860,923, filed Apr. 11, 2013, 2013/0275406A1, Sebastien Richard.
Summons to attend oral proceedings pursuant to Rule 115(1) EPC issued Jun. 25, 2019; in European Application Serial No. 15306826.7-1222/3171281. (7 pgs.).
Oleg Kalnichevski; "HttpClient—HttpClient Performance Optimization Guide"; Feb. 8, 2008 Retrieved From The Internet: URL:https://hc.apache.org/httpcilent-3.x/performance.html; retrieved on Jun. 13, 2019; XP055596110; 6 pgs.
Liping Xu, et al.; "A Method of Focused Crawling for Software Components"; 2011 International Conference on Transportation, Mechanical, and Electrical Engineering (TMEE); Dec. 16, 2011; XP032181113; ISBN: 978-1-4577-1700-0; Changchun, China; 4 pgs.

* cited by examiner

THEMATIC WEB CORPUS

CROSS-REFERENCE TO RELATED APPLICATIONS

This application claims priority under 35 U.S.C. § 119 or 365 to European Application No. 15306826.7, filed Nov. 17, 2015. The entire contents of each of the above applications are incorporated herein by reference.

FIELD OF THE INVENTION

The invention relates to the field of computer programs and systems for web crawling, and more specifically to methods, systems and programs for building a Web corpus that relates to a theme.

BACKGROUND

A number of systems and programs are offered on the market for crawling the Web, for example in order to build a corpus of any type of documents (generally called "Web corpus" with reference to the fact that the documents are retrieved from the Web). The corpus can then be used for later search, analysis, and/or any other use. Usually available techniques do not allow the building of a specialized Web corpus, such as a corpus that relates to a theme (or "thematic Web corpus"), or with imperfect precision and/or recall.

Figure 1:
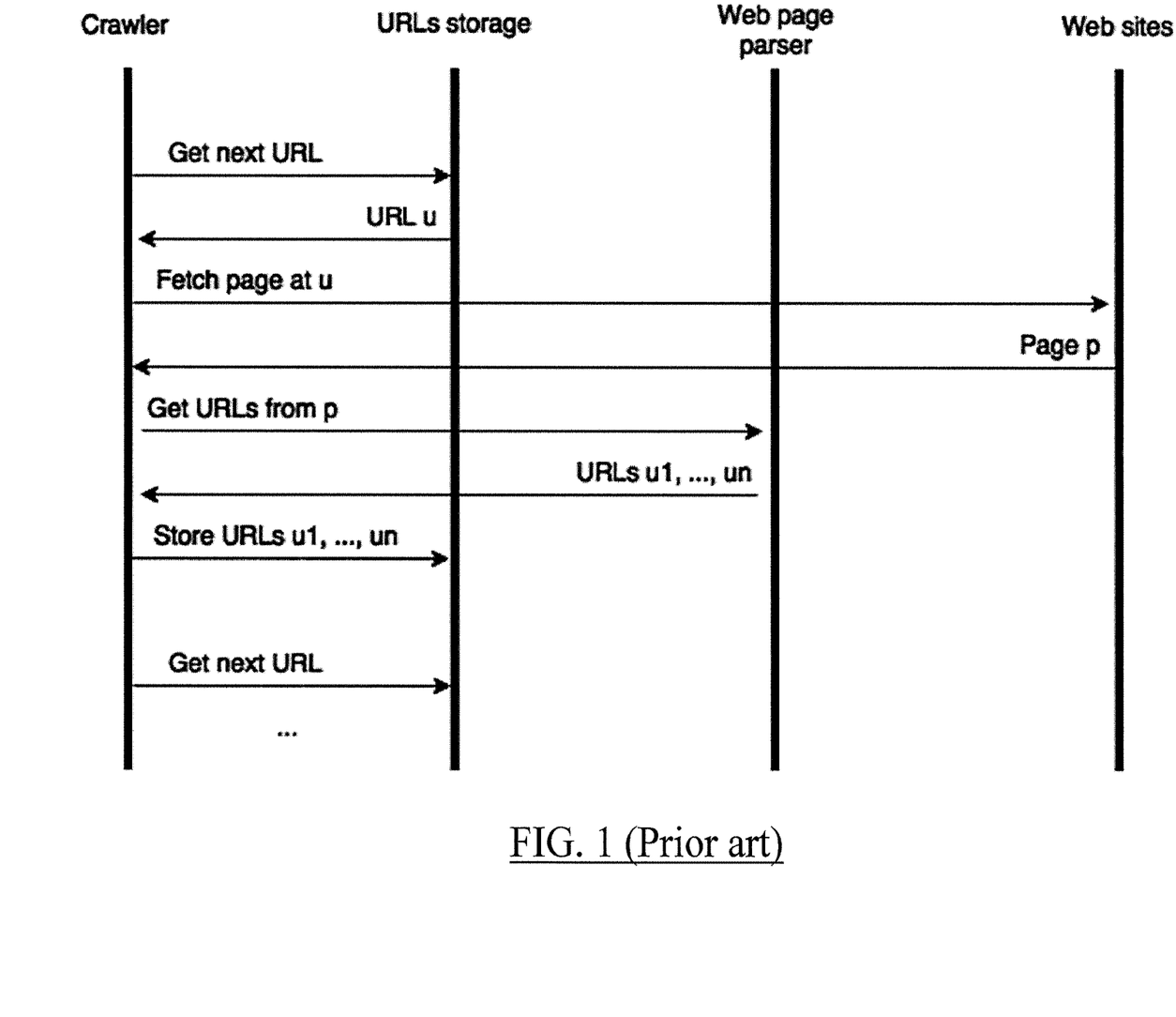
FIGS. 1-2 show chronology of prior art crawling techniques.

Standard Web crawling (shown on FIG. 1, which represents chronology from the top to the bottom, and described for example in Taubes, Gary—*Indexing the Internet*—Science 269.5229, 1995) involves starting with seed URLs, downloading the pages at these URLs, and parsing each page to collect more URLs to visit. This method is inefficient to collect a thematic corpus, because out-of-topic pages might link to in-topic pages (i.e. pages that relate to the theme), perhaps after multiple links. One extreme option is to not follow links from out-of-topic pages. This yields a poor recall (i.e. number of in-topic pages eventually in built corpus relative to total number initially present in the Web). Another extreme option consists in crawling the whole Web. This has a very poor precision (i.e. number of in-topic pages in built corpus relative to total number of crawled pages, be they included or not to the corpus).

Figure 2:
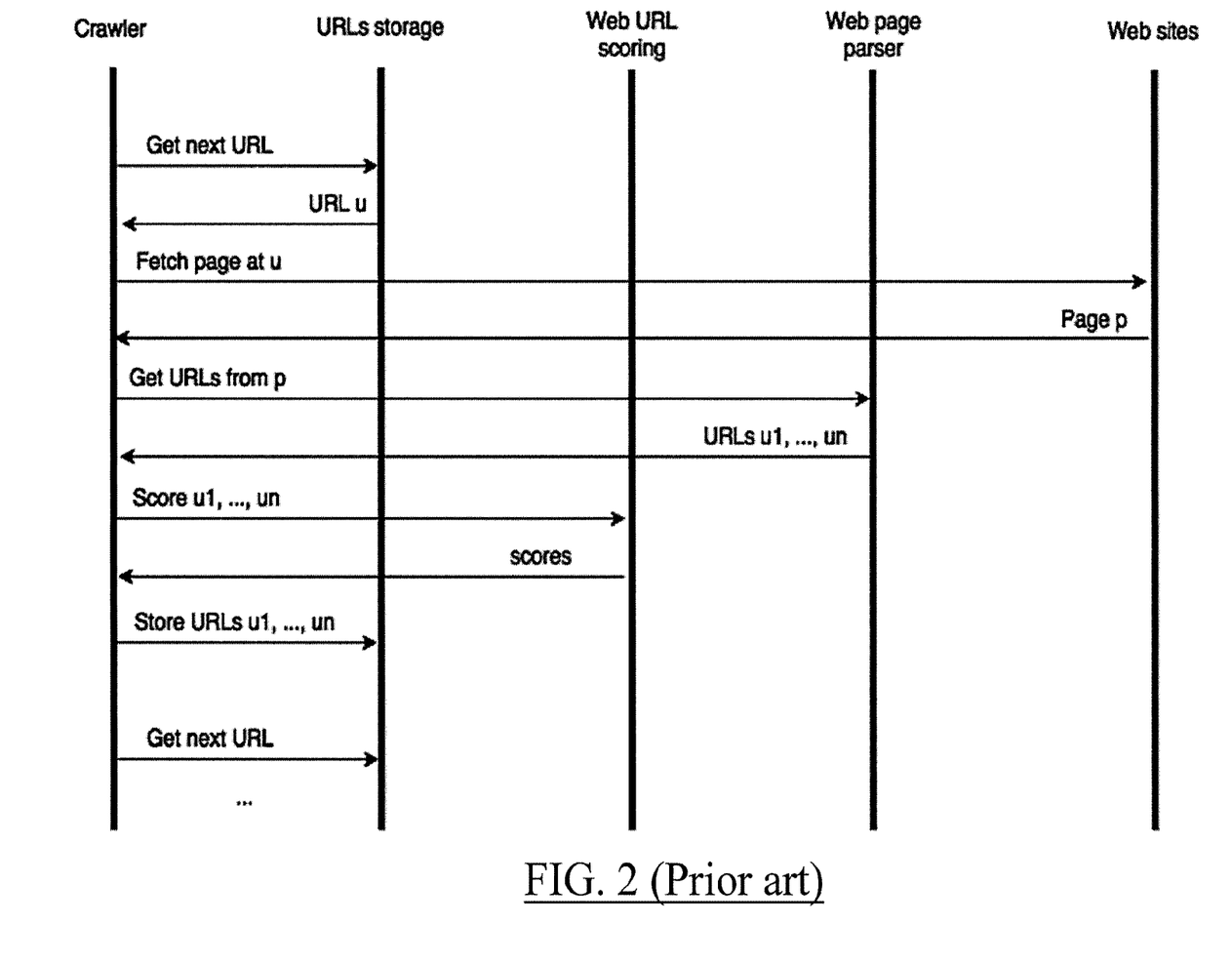

Focused Web crawling (shown on FIG. 2 which represents chronology from the top to the bottom, and described for example in Novak, Blaž—*A survey of focused Web crawling algorithms*—Proceedings of SIKDD 5558, 2004) was thus invented to alleviate the drawbacks of standard Web crawling, while keeping a similar method. A focused crawler uses an additional step that consists in giving a score to a Web page supposed to relate to the probability that the page links to another page that eventually links to an in-topic page. This method is generally expected to find a compromise between the extreme options described above. Yet, it does not yield high enough precision or recall. It only improves precision with regards to crawling the whole Web, because it reduces the number of crawled out-of-topic pages. It improves recall with regards to stopping at out-of-topic pages because it tolerates some of them with high estimated probability to eventually link to in-topic pages.

Within this context, there is still a need for an improved solution to build a thematic Web corpus efficiently, i.e. with reasonable computational costs, precision and recall.

SUMMARY OF THE INVENTION

It is provided a computer-implemented method, performed by a server storing an index of a search engine, for sending, to a client, the URLs of pages of a Web corpus that relates to a theme. The method comprises receiving, from the client, a structured query that corresponds to the theme, the structured query consisting of a disjunction of at least one keyword. The method also comprises determining in the index the group that consists of the URLs of all pages that match the query. The determining consists in reading the keywords of the disjunction of the query on the index, thereby retrieving at least one set of URLs from the index, then performing on the retrieved at least one set of URLs a scheme of set operations that corresponds to the disjunction of the query, thereby leading to the group of URLs. And the method comprises sending to the client the URLs of the group as a stream.

In an example, the sending to the client of the URLs of the group as a stream may comprise establishing a network connection (for example, a HTTP connection) with the client, streaming the URLs of the group on the network connection; then closing the network connection.

It is further provided a computer-implemented method for building a Web corpus that relates to a theme. This method comprises sending, by a client, to a server storing an index of a search engine, a structured query that corresponds to the theme, the structured query consisting of a disjunction of at least one keyword; then sending, by the server, to the client, the URLs of pages of the Web corpus as a stream, based on the structured query and according to the above-mentioned method for sending performed by a server.

In an example, this method involving a client and a server further comprises, by the client, storing locally the URLs received from the server as a stream. In an example, method involving a client and a server then further comprises, by the client, crawling the pages of the URLs received from the server or transmitting the URLs received from the server to a Web crawler.

It is further provided a computer-implemented method, performed by a client, for building a Web corpus that relates to a theme, wherein the method comprises sending, to a server, a structured query that corresponds to the theme, the structured query consisting of a disjunction of at least one keyword; then receiving from the server the URLs of pages of the Web corpus as a stream.

In an example, this method performed by a client further comprises storing locally the URLs received from the server as a stream.

It is further provided a computer program comprising instructions for performing any or combinations of such methods.

It is further provided a computer-readable medium having recorded thereon the computer program.

It is further provided a system comprising a processor coupled to a memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 3:
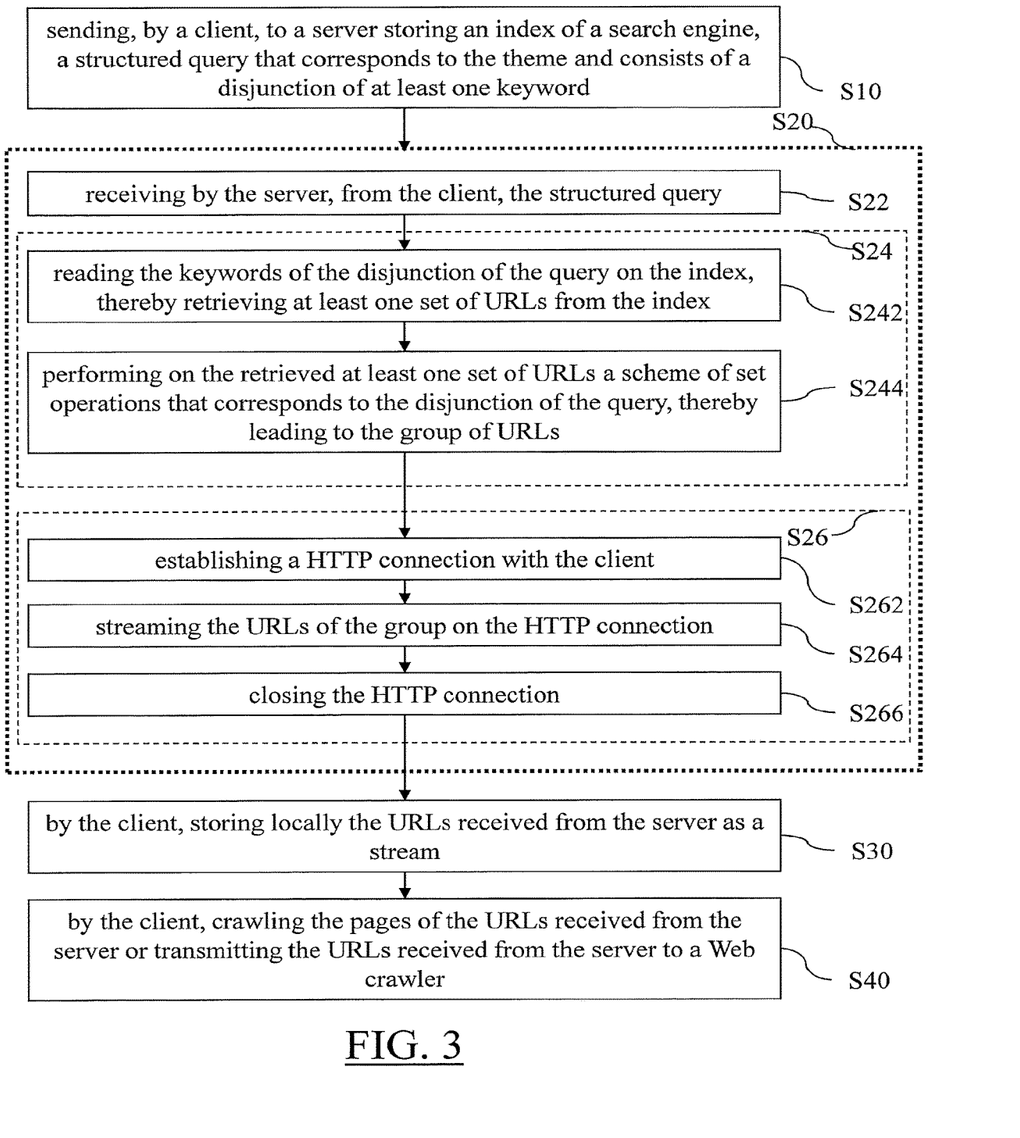
FIG. 3 shows a flowchart of an example of the method.

The flowchart of FIG. 3 shows an example of the computer-implemented method for building a Web corpus that relates to a theme, performed by a client-server system. The method of the example comprises sending S10, by a client, to a server storing an index of a search engine, a structured query. The structured query corresponds to the theme and consists of a disjunction of at least one keyword. Then, the method comprises sending S20, by the server, to the client, the URLs of pages of the Web corpus as a stream, based on the structured query. The sending S20 comprises, upon receiving S22 by the server, from the client, the structured query, determining S24 in the index the group (i.e. the term "group" merely referring to a set) that consists of the URLs of all pages that match the query. The determining S24 consists in reading S242 the keywords of the disjunction of the query on the index (i.e. comparing the keywords to entries of the index), thereby retrieving at least one set of URLs from the index (i.e. outputting pieces of data of the index whose entries match the keywords—exactly or approximately, depending on the relaxation capabilities used with the search engine, if any, as known per se), and then performing S244 on the retrieved set(s) of URLs a scheme of (at least one) set operation(s), the scheme corresponding to the disjunction of the query, thereby leading to the group of URLs (i.e. the "results" of the query to be returned). And the sending S20 also comprises sending S26 to the client the URLs of the group as a stream. The sending S26 comprises establishing S262 a HTTP connection with the client (the establishing S262 possibly but not necessarily corresponding to an opening of such connection, as the HTTP connection may have been first opened before, e.g. prior to the sending S10, and the establishing S262 thus corresponding to a retrieval/continual of such connection). The sending S26 also comprises streaming S264 the URLs of the group on the HTTP connection (i.e. through the HTTP connection). Then the sending S26 in the example comprises closing S266 the HTTP connection. The method of the example further comprises, by the client, storing S30 locally (e.g. on a persistent memory, e.g. of the same machine of the client which receives the URLs) the URLs received from the server as a stream. The method then further comprises, by the client, crawling S40 the pages of the URLs received from the server (e.g. by the same machine of the client, or by another machine, whereby the method may in such a case comprise transmitting the URLs received from the server to a Web crawler).

Such a method improves the building of a thematic Web corpus.

Notably, because the crawling S40 is performed on the pages of the URLs of the group (which group consists of the URLs of all pages that match the structured query that corresponds to the theme), the precision and the recall of the method with respect to the theme are relatively high. Indeed, as known in this field, a thematic Web corpus is a set of Web documents/pages (e.g. of any type) that relate to a specific theme/topic. Also, as known per se, a search engine index (e.g. an inverted index) is (or at least includes) a collection of organized pieces of data that can be easily (i.e. directly and in a relatively fast manner) retrieved via structured queries inputted to a connected search engine (a structured query being, as classical in such technology, any disjunction of at least one keyword, e.g. written according to—that is, respecting—predetermined grammar and/or syntax rules provided by the search engine, if any). The method of FIG. 3 takes advantage of this context to build/create the thematic corpus, as this is done via a structured query that corresponds to the theme (i.e. the results of the structured query, given the search engine and its index, are documents within the theme, e.g. and at least substantially all such documents). For that purpose, the structured query can be pre-designed to the method of FIG. 3, in any way, for example by a user and/or a team of users, given the specifications of the Web corpus to be built (e.g. description(s) of the contemplated theme), being noted that the specific way to design the structured query is not within the scope of the present discussion (although an example is provided later at steps 1 and 2 of the algorithm). In a sense, the thematic Web corpus can in such a context be merely defined as the corpus of pages/documents that corresponds to the URLs stored at S30 (and thus potentially crawled at S40), and thus to the results of the structured query (which can be seen as predetermined—in any way—from the point of view of the method of FIG. 3). Thanks to that, the crawling S40 may be qualified as "focused", as it may be performed (sequentially or with the use of parallel crawling), at least mostly (e.g. for more than 90% of the crawled pages, if not 100%) on the URLs of the group (those sent at S26), which may themselves at least mostly (if not all) point to pages related to the theme.

Thanks to the fact that said URLs are sent by the server to the client at S264, the method does not necessarily burden the server with storing all the URLs and/or performing the eventual focused crawling. In an example, the method may exclude that the server persistently store the group (at least upon the sending S10, i.e. within S20). By "storing the group", it is meant that the information stored include not-only the URLs of the group but also information that said URLs form or are part of a group. In other words, at the server, the group may be recorded at best on volatile memory, e.g. before the sending S26, or even never stored as a group (e.g. the URLs of the group being merely recorded—e.g. on volatile memory—and streamed as they are recorded), and in any case the group may possibly never be stored (as a group) on non-volatile memory. On the contrary, at S30 the client may store the URLs, specifically as a group, and/or on non-volatile (i.e. persistent) memory. The method may similarly exclude that the server ever perform a focused crawling of said URLs (again at least upon the sending S10, i.e. within S20, since the server may have crawled the URLs prior to the method, e.g. when building the search engine, but in which case within a non-focused crawling). On the contrary, at S40 the client performs such a focused crawling (being noted that, depending on the contemplated application, the client may equivalently send the relevant information—e.g. the group of URLs—to a third party—or alternatively even back to the server, later in time—that may perform such crawling, the method of FIG. 3 being merely an example in this aspect).

Thanks to the fact that the determining S24 of the results of the query (i.e. the group in the index that consists of the URLs of all pages that match the query) consists (i.e. exactly, e.g. with no additional—later or interlaced—ranking of said URLS) in reading S242 the keywords of the disjunction of the query on the index, thereby retrieving at least one set of URLs from the index (i.e. the output of the reading S242), and then performing S244 on the retrieved at least one set of URLs a scheme of set operations that corresponds to the disjunction of the query, thereby leading to the group of URLs (i.e. the output of the scheme S244), the method of FIG. 3 is performed relatively fast from the server point of view. Indeed, as known per se from the field of search engines, a search engine index always implements a form of S242 and S244, which may thus be performed classically and need not be extensively detailed. However, classical search engines further rank the results before returning them to the client having sent the structured query. Such ranking takes time and also consumes hardware resources (as documents are stored in transient memory, including RAM, for the ranking algorithms to access them), but is not performed by the method, which smartly identifies it as unnecessary for the purpose of building the thematic Web corpus via the later crawling S40. Thus, S24 is restricted to the extraction at S242 from the index of (e.g. all) sets (of URLs) that match the different keywords (e.g. each respective keyword) of the query (being noted that when the index is stored on several distinct servers, as is usually the case, different sets may correspondingly be retrieved for a same keyword, as known to the skilled person), and to perform at S244 a final scheme of set operations (i.e. mathematical operations that take sets as inputs) in accordance with the structured query (the way to derive the scheme from the disjunction being not discussed in details herein, as it is classical and known per se from the field). Furthermore, as they perform a ranking, classical search engines usually do not implement S242 exhaustively. Indeed, classically, the query does not necessarily need to be performed against all URLs. It is first performed against smaller sub-indexes that in most case suffice to populate the first result pages. Indeed, ranking takes into account some parameters, including popularity and quality of content, that do not depend on the query, and for most queries, pages of top popularity or quality of content suffice to fill the first pages of results. For example, a user may first receive a first page of highest-ranked result, and then ask page-by-page for lower-ranked results, the search engine index computing the sets and performing the set operations as the user asks further results. On the contrary, in the method of FIG. 3, S242 may be performed continuously/uninterruptedly until all candidate sets and/or URLs are determined, the method thereby determining at S24 all the results of the query uninterruptedly and independently of the user interacting with the computations e.g. to request further results.

Thanks to the fact that said URLs are sent by the server as a stream, the method of FIG. 3 not only does not require the server to ever store at once all the results (even on non-volatile memory), which may thus be excluded by the method, but it is also performed fast from the client point of view. The notion of a stream is widely known in the field of computer science. The streaming S26 amounts for the server to send an URL as soon as it is it is determined as a result of the structured query (as opposed to classical search engines which perform a prior ranking and send data in a batch). Typically, a streaming method consists in a session opening, a stream, and a session closing. The method of FIG. 1 implements a specific example of such streaming S26 through a HTTP connection. A HTTP connection works particularly well, but other protocols may be implemented by the method (such as for example a FTP connection), and more generally any network connection.

Figure 4:
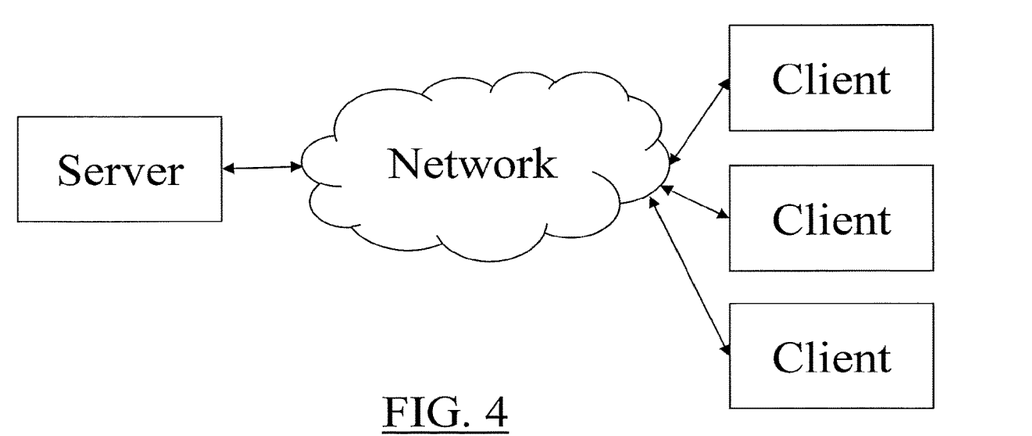
FIG. 4 shows an example of a server-clients network.
Figure 5:
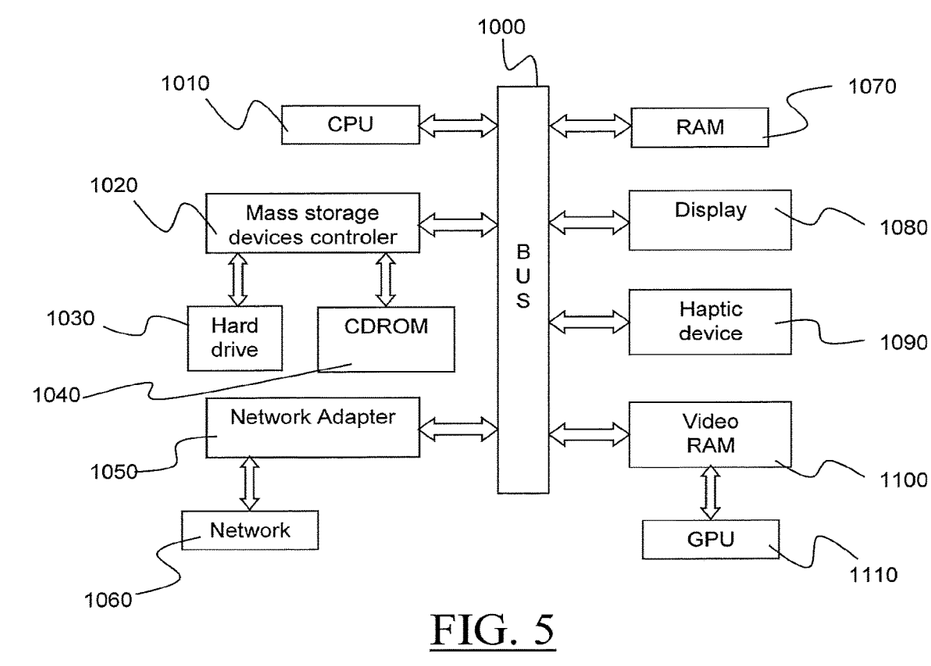
FIG. 5 shows an example of a system.

The method is computer-implemented. This means that each step (or substantially all the steps) of the method are executed by at least one computer, or any system alike, that is, a system comprising at least one processor coupled to a memory having recorded thereon a computer program, the program comprising instructions for performing the method. The memory may also store a database. The memory is any hardware adapted for such storage, possibly comprising several physical distinct parts (e.g. one for the program, and possibly one for the database). In specific, the method is performed by a client system communicating with a server system, the two systems being possibly distinct machines and also possibly geographically distant (e.g. at least in different rooms, buildings, cities or even countries). This means that the client and the server comprise hardware and/or software adapted for them to be communicatively coupled, typically through a network (e.g. the Internet). FIG. 4 shows an example of such a network, where any client may be involved with the server in a method according to the one of FIG. 3.

Thus, steps of the method are performed possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. In an example, prior to S10 the method comprises a user or a team designing the structured query, inputting the designed structured query to the client, and then triggering S10. S20 may then be performed automatically, possibly upon on an authorization provided automatically or by user (e.g. in a pre-defined way or manually upon the receiving S22). S30 may be performed automatically, possibly upon a user-confirmation. And S40 may be pre-defined to be performed automatically or launched whenever needed. Examples are provided later.

FIG. 3 shows an example of a computer system, which can represent the client and/or the server. The computer of the example comprises a central processing unit (CPU) 1010 connected to an internal communication BUS 1000, a random access memory (RAM) 1070 also connected to the BUS. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The computer of the example is further provided with a graphical processing unit (GPU) 1110 which is associated with a video random access memory 1100 connected to the BUS. Video RAM 1100 is also known in the art as frame buffer. The computer may also include a haptic device 1090 such as cursor control device, a keyboard or the like. A cursor control device is used in the computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The term "memory" may refer to any memory storage or to a series of connected memory storage. Building a Web index refers to indexing a Web corpus. As mentioned earlier, a corpus is a set of documents (e.g. public Web/private enterprise). An index of a search engine may refer to a system that selects and ranks documents to provide a response to a query formulated through the use of the interface of the search engine or a search based application (SBA). A corpus may be the set of documents available to an index for selection and ranking. A Web corpus is a corpus of documents initially found on the Web: including Web pages, but also documents such as PDF, images or the like, found by means of URLs on Web pages. A Web index is an index based on a Web corpus. A thematic index may be the index of a search engine or a search-based application dedicated to queries related to a specific topic. These include all professional (B2B) search engines and SBA, which are at least specialized in topics related to the industry of the user. A professional search engine or SBA is typically built to support predefined usage scenarios, which set a limited scope for the queries that are expected on the index. A corpus being a set of documents, e.g. Web pages (as contemplated in the case of the method), a thematic Web corpus is the corpus of a thematic Web index, that is, the documents (such as Web pages) available to the index for selection in response to queries.

For example, a specialized search engine or SBA may be dedicated to providing information about a theme e.g. about financial assets, for use by investors. Queries typically contain assets in users' portfolios. In one possible implementation, an investor does not manually type a query. The query is generated based on their current investment portfolio. In response to the query, selected news with highest potential impact on their portfolio are returned, the most relevant first. It is commonly understood by developers and users of a specialized search engine or SBA, that not all queries are supported. If the search engine or SBA interface shows a query box in which users can provide free queries, a user can technically enter unsupported queries. For instance, an investor might suddenly think of his/her grandmother and attempt to inquire about her health using that query box although his/her search engine is specialized on financial assets. The query might look like [grandmother health status]. However, because it is specialized on financial assets, the search engine might not respond to this query with relevant pages. This would not be a defect of the search engine, only an improper use of it.

The method of FIG. 3 specifically allows building a thematic Web corpus, e.g. for such purposes. In particular the method does not concern with filtering or ranking documents, which is the responsibility of the index. The method does not concern with the interface of the search engine or SBA either. When building a thematic Web corpus, the method of FIG. 3 enables the collection of exactly the set of Web pages that could be returned in response to a query on a thematic Web index. Not more: any page that would never be returned in response to a query on the index is useless and takes up storage and RAM space unnecessarily. Not less: a Web page that would be relevant to a query should be in the corpus so that the user receives it in response to that query (otherwise the recall of the index would be affected). As extensively discussed above, the method of FIG. 3 is similar to that of a crawl with the help of a search engine, except that a special type of search engine is provided (a URL streaming exhaustive search engine, aka streaming search). A Web search engine typically responds to a query with a page in machine readable format (for example HTML, XML or JSON) that is used to display links and summaries related to a small number of results of the query. A crawl with the help of a Web search engine, such as the method of FIG. 3, could thus consist in querying multiple such pages to extract the links on each of these pages and crawl these links. The streaming S24 and S26 search alleviates the drawbacks of a classical search engine for use in corpus collection. It does not rank Web pages, and it does not respond with a page of results. Instead, it responds with a stream of URLs in the order in which they are found in the index. The crawler may then contact at S40 Web sites to retrieve the pages identified by these URLs. Precision is high: the corpus can consist exactly of the Web pages that match the query, assuming the query accurately describes the topic and the index used for the query is fresh (there are few differences between pages stored in the index and the same pages currently served on the Web, so that the index response is accurate). Recall is high: the corpus may consist of all of the Web pages that match the query, assuming the index used for the query is complete and fresh. Cost is low: no unnecessary operations need to be made. The main overall cost is the cost of building the initial index. The global cost per thematic corpus is lower as the number of thematic corpuses built using the same index is high.

Generic Web search engines typically provide a search bar and a list of search results. Specialized search engines and SBAs typically also provide advanced navigation and graphs. Navigation options may include browsing through assets by category. For example, top level categories may include "stocks", "derivatives", "currencies", "raw materials", etc. A click on "stocks" may expand a list of stocks from the user's portfolio, found on recent news. A click on a stock may filter the news to display only those relevant to selected stock. Graphs may include a daily top assets bar chart, with higher bars representing assets most cited in today's news. These navigation options and graphical representation rely on the detection of every asset in every document. When a reference to an asset is found in a document, the index may store it in RAM because RAM is much more responsive than disks, and displaying navigation options and graphs requires iterating quickly through these references. These references are called facets. Facets used for navigation and graphs take up RAM space that increases with the number of documents in the index. RAM space is expensive and is often the bottleneck in the hardware infrastructure of specialized search engines or SBAs. The richer the interface, the more facets are potentially extracted from each document, and the more RAM space should be allocated per document in the corpus. In specialized search engines or SBAs, because the typical concern of a user is known, one can provide a richer interface including navigation options and graphs that knowingly may be relevant to the topic. As a consequence, more facets are needed, and one must pay more attention to the size of the corpus. It is better that the corpus does not contain unnecessary documents. As a consequence, there is a real need for a way to provide corpuses that contain all and only the documents necessary for an index responding to queries made through the interface of a specialized search engine or SBA. And the method of FIG. 3 responds to such a need.

Figure 6:
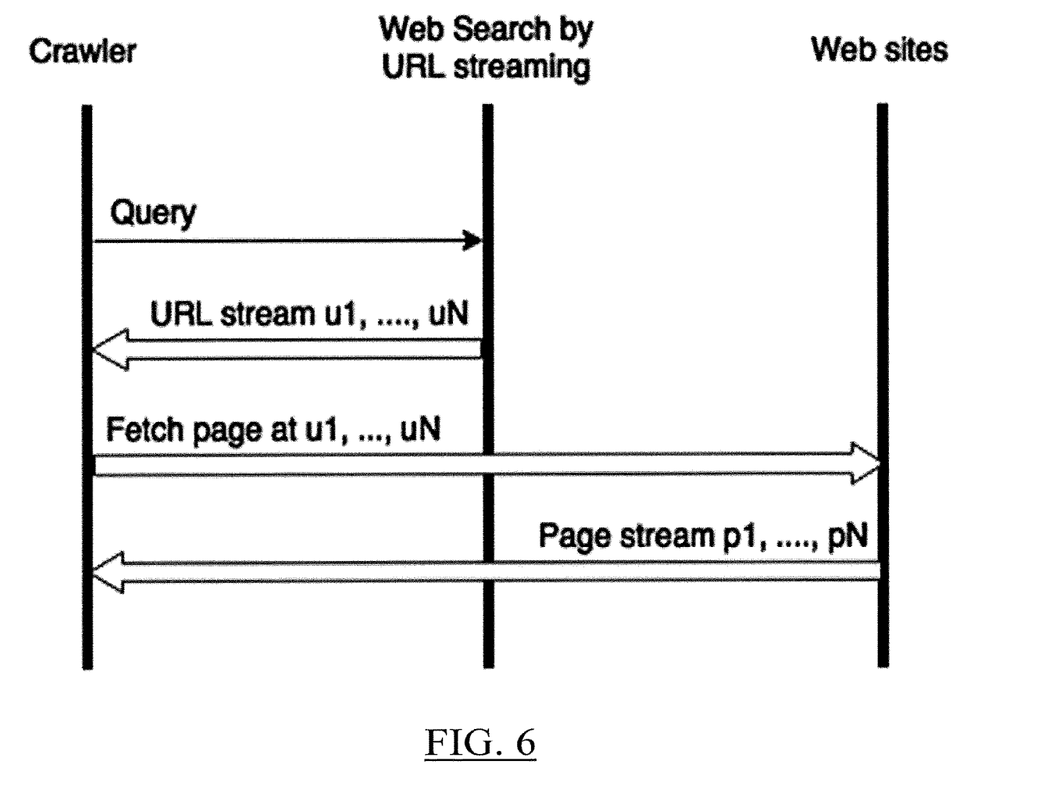
FIG. 6 shows an example chronology of the method for building a Web corpus.

An example method for building a thematic Web corpus in accordance with the example of FIG. 3 is now discussed, with reference to FIG. 6 which shows (from the top to the bottom) the below-discussed chronology.

Given the set Q of all possible queries supported by a thematic index, the ideal thematic corpus C for this index is the set of documents that match the query q=OR (q', for q' in Q): the disjunction of all queries supported by the index. The thematic corpus consists of all documents susceptible to appear in results of a query of Q (i.e. all such documents and not more). The following algorithm describes how to build C using the method of FIG. 3:

0. Create an empty list L.
1. Collect a query q' to be supported by the index. This could be done based on interviewing prospective users or based on the specifications of the search engine or SBA.
2. Write the query found in 1 in its disjunctive normal form d. q' is a Boolean expression, so d exists and is unique.
3. For each conjunctive clause c in d, if c contains no element of L (replace exact expressions in c with conjunctive clauses of its terms, e.g. ['a b c' AND d] is eliminated if [a] is in L):
    3.1. Find replacements for terms of c such that c with replacements would still be supported. (For instance, replacing a company code in a stock exchange by every other company code. For large number of replacements, this step should typically be scripted.)
    3.2. Generate c1, . . . , cn the conjunctive clauses with all combinations of possible replacements.
    3.3. Execute each query c1, . . . , cn with the system according to the invention and add the result to the corpus.
    3.4. store c1, . . . and cn in L
4. Iterate on 1 until (a) no more supported query can be found or (b) no more supported query can be found that pass 3.0.

Theoretically, the method terminates because the number of terms is finite. In practice, starting with queries with no or few ANDS allows to stop quickly with 4.b. The method only collects useful pages. Methods based on crawling also collect pages that are not useful because it is impossible to know whether the page is useful before collecting it. Prior art crawling (including focused crawling) has a relatively low precision, compared to the method. In examples, the precision of the method is 100%. The recall of the method is only limited by the size of the reference Web index. If the reference Web index contained all Web pages, the recall of the method may be 100%. In practice the reference Web index is not exhaustive. In an implementation, the method can use a Web index of 32 billion pages. Missing pages in the reference index decrease the recall of the method. Because of the cost of building the reference Web index, the method is particularly cost-effective when the reference Web index is already available or when multiple thematic indexes are to be built based on it. Crawling incurs the latency of Web site servers. At each step a crawler needs to load a Web page to collect URLs of new pages to crawl. The method collects typically large amounts of Web pages at a time in response to each query.

An example of the method of FIG. 3 that implements example features is now discussed.

In a first step of this example the user may select a query. For instance, the user selects query "Obama" because the goal is to eventually retrieve Web documents about Obama. The query can be more complex, for example "Obama and 'Presidential race' and -Michelle" for documents related to Obama and the presidential race, but not to Michelle Obama. The user may insert the query in a text field presented in a configuration interface. The user may also select whether it is a one-shot query or whether it should be done regularly. In the latter case, the user selects at which intervals the query should be executed. The user may also select the maximum number of documents that should be retrieved. The total number of matching documents can be to the order of hundreds of millions, and users typically restrict to a few millions the number of documents collected on the basis of a query. These few millions of documents may be randomly collected from the total number of matching documents, as there is no sorting step involved. More precisely, they may be the first documents found in the index that match the query. The query may be executed when the user hits or clicks the "run" button on the administration interface, or when the scheduled time is up. The query may then be sent at S10 to the index for execution through an HTTP (or HTTPS) request. The request typically travels through an external network starting from the customer's servers (where the thematic corpus should be collected) to the streaming index, typically located on the servers of a remote service, which receives the query at S22.

The streaming index typically resolves the query using the following two steps. In a first step S242, it looks up the keywords of the query in a structure called lookup tables/inverted lists/dictionaries. This structure is a set of sorted lists of keywords pointing to the identifiers of the documents that contain these keywords. Keywords are sorted so that looking them up is fast. In order to appear with unique identifiers in this structure, Web documents have been crawled, stored and indexed in a separate process. Crawling means collecting them from their respective Web site servers (by issuing a HTTP query to these servers containing the URL of the document). Storing means copying on a local cache (in order to avoid requesting the document multiple times). Indexing involves extracting the words of the document (maybe selecting them and normalizing them before), and adding the ID of the document in front of each resulting word in the inverted lists (maybe adding the word to the inverted list if necessary). In a second step S244, the index interprets the logical formula of the query and applies set operations on the documents found in the first step. For example, the index returns the set of documents containing "Obama" intersected with the set of documents containing "Presidential race" excluding the set of documents containing "Michelle". These are operations typically performed by a standard search engine. In a standard search engine, this step is followed by other steps that serve to rank documents in the order of most relevant to least relevant. The method of FIG. 3 does not implement those steps.

In practice, the two steps described above are not done in sequence. For example, a subset of the documents containing "Obama" can be listed first, and filtered based on whether they also contain "Presidential race" and "Michelle", before another set of documents containing Obama would be processed. In general, the results may be processed by batch corresponding to the distributed storage server on which they are found, and further broken down according to the RAM available on a processing server to process them. In addition, there may be a hierarchy of inverted lists, where the first lists in the hierarchy are looked up first because they tend to give more relevant results. Top inverted lists typically only store keywords found on premium locations of the Web page, such as the title, or on links found on other Web pages and pointing to the Web page. All of these internal structures and algorithms intended to optimize the performance of the index, may have an impact on the order in which documents matching the query are retrieved.

While retrieving documents, the index responds to the query using the HTTP connection opened by the query (S262 being thereby performed upon S10 in this example), and streams S264 the URLs of the documents as they are retrieved (not the documents themselves). The process on the client that started the connection and issued the query receives the URLs from the streaming index. In a preferred implementation, this client process transmits the URLs to a crawler. The crawler may be another process typically executed on the same system. The crawler is responsible for retrieving at S40 the documents corresponding to these URLs from their respective Websites. In another implementation, the process that receives the URLs stores them locally (e.g. on disk) at S30 and the crawler reads them from their local storage for performing S40.

As classical, the crawler may work by issuing an HTTP request using each retrieved URL. The request is directed to the Website's servers using the Internet infrastructure, including name servers that convert URLs into IP addresses and routers that transmit packets according to the destination IP address. Each Website server responds (or not) with the documents corresponding to the URLs given in the request. In an example, the crawler implements procedures to request documents in parallel to multiple Websites while respecting a limit to the load on these Websites. Typically, it does not request more than one page every 2.5 seconds from the same Website. A crawler is typically a set of processes that run in parallel, each being responsible for a subset of the Websites. For example, a process is responsible for querying Websites whose name starts with an 'A', etc. In an example, where the corpus is useful to build an index of documents, the crawler may then do two things. (1) Store documents as they are received into a local cache, which is simply a local storage where documents are identified by their respective URLs and can be looked up by URL. (2) Push the documents as they are received to another process responsible for processing documents and indexing them.

The invention claimed is:

1. A computer-implemented method for building a thematic Web index that relates to a theme, the method comprising:

by a server having stored thereon an index of a search engine having been built with a non-focused crawling:
   receiving, from a client, a structured query that corresponds to the theme, the structured query consisting of a disjunction of at least one keyword;
   determining in the index the group that consists of the URLs of all pages in the index that match the query, wherein the determining consists in:
      reading the keywords of the disjunction of the query on the index, thereby retrieving at least one set of URLs from the index, then
      performing on the retrieved at least one set of URLs a scheme of set operations that corresponds to the disjunction of the query, thereby leading to the group of URLs; and
   sending to the client the URLs of the group as a stream, the URLs being sent unranked relative to popularity and/or quality of content, each URL of the URLs being sent as soon as the URL is determined as a result of the structured query, the server never storing at once all the results of the structured query;

by the client:
   building a Web corpus that relates to the theme, the building of the Web corpus comprising fetching the pages of the URLs received from the server, the Web corpus being defined as the corpus of pages that corresponds to the results of the structured query; and
   indexing the Web corpus,
   wherein the thematic Web index is the index of a search-based application supporting queries related to a specific topic, and the building of the Web corpus is performed according to the following algorithm:
      a) create a list L which is initially empty;
      b) collect a supported query q';
      c) write the supported query q' in disjunctive normal form d;
      d) for each conjunctive clause c in the disjunctive normal form d, e) if the conjunctive clause c contains no element of the list L:
         e1) find replacements for terms of the conjunctive clause c such that the conjunctive clause c with replacements would still be supported;
         e2) generate conjunctive clauses $c_1, \ldots, c_n$ with all combinations of possible replacements;
         e3) execute each query for conjunctive clauses $c_1, \ldots, c_n$ and add result to the Web corpus;
         e4) store conjunctive clauses $c_1, \ldots, c_n$ in the list L;
      f) iterate beginning at a) until: (1) no more supported queries can be found or (2) no more supported queries can be found that pass e).

2. The computer-implemented method of claim 1, wherein the sending to the client of the URLs of the group as a stream comprises:
   establishing a network connection with the client;
   streaming the URLs of the group on the network connection; then
   closing the network connection.

3. The computer-implemented method of claim 2, wherein the network connection is a HTTP connection.

4. A non-transitory computer-readable medium having recorded thereon a computer program comprising instructions for performing a computer-implemented method for building a thematic Web index that relates to a theme, the method comprising:

by a server having stored thereon an index of a search engine having been built with a non-focused crawling:
   receiving, from a client, a structured query that corresponds to the theme, the structured query consisting of a disjunction of at least one keyword;
   determining in the index the group that consists of the URLs of all pages in the index that match the query, wherein the determining consists in:

reading the keywords of the disjunction of the query on the index, thereby retrieving at least one set of URLs from the index, then performing on the retrieved at least one set of URLs a scheme of set operations that corresponds to the disjunction of the query, thereby leading to the group of URLs; and sending to the client the URLs of the group as a stream, the URLs being sent unranked relative to popularity and/or quality of content, each URL of the URLs being sent as soon as the URL is determined as a result of the structured query, the server never storing at once all the results of the structured query;

by the client:

building a Web corpus that relates to the theme, the building of the Web corpus comprising fetching the pages of the URLs received from the server, the Web corpus being defined as the corpus of pages that corresponds to the results of the structured query; and indexing the Web corpus, wherein the thematic Web index is the index of a search-based application supporting queries related to a specific topic, and the building of the Web corpus is performed according to the following algorithm:
a) create a list L which is initially empty;
b) collect a supported query q';
c) write the supported query q' in disjunctive normal form d;
d) for each conjunctive clause c in the disjunctive normal form d, e) if the conjunctive clause c contains no element of the list L:
e1) find replacements for terms of the conjunctive clause c such that the conjunctive clause c with replacements would still be supported;
e2) generate conjunctive clauses c1, . . . , cn with all combinations of possible replacements;
e3) execute each query for conjunctive clauses c1, . . . , cn and add result to the Web corpus;
e4) store conjunctive clauses c1, . . . , cn in the list L;
f) iterate beginning at a) until: (1) no more supported queries can be found or (2) no more supported queries can be found that pass e).

5. A system for building a thematic Web index that relates to a theme comprising:
a server; and
a client,
wherein the server includes a processor coupled to a memory having stored therein an index of a search engine having been built with a non-focused crawling and a computer program that when executed by the processor causes the processor to be configured to:
receive, from a client, a structured query that corresponds to the theme, the structured query consisting of a disjunction of at least one keyword;
determine in the index the group that consists of the URLs of all pages in the index that match the query, wherein the determining consists in:

reading the keywords of the disjunction of the query on the index, thereby retrieving at least one set of URLs from the index, then performing on the retrieved at least one set of URLs a scheme of set operations that corresponds to the disjunction of the query, thereby leading to the group of URLs; and send to the client the URLs of the group as a stream, the URLs being sent unranked relative to popularity and/or quality of content, each URL of the URLs being sent as soon as the URL is determined as a result of the structured query, the server never storing at once all the results of the structured query, and wherein the client has a second processor configured to:
build a Web corpus that relates to the theme, the building of the Web corpus comprising fetching the pages of the URLs received from the server, the Web corpus being defined as the corpus of pages that corresponds to the results of the structured query; and index the Web corpus, wherein the thematic Web index is the index of a search-based application supporting queries related to a specific topic, and the building of the Web corpus is performed according to the following algorithm:
a) create a list L which is initially empty;
b) collect a supported query q';
c) write the supported query q' in disjunctive normal form d;
d) for each conjunctive clause c in the disjunctive normal form d, e) if the conjunctive clause c contains no element of the list L:
e1) find replacements for terms of the conjunctive clause c such that the conjunctive clause c with replacements would still be supported;
e2) generate conjunctive clauses c1, . . . , cn with all combinations of possible replacements;
e3) execute each query for conjunctive clauses c1, . . . , cn and add result to the Web corpus;
e4) store conjunctive clauses c1, . . . , cn in the list L;
f) iterate beginning at a) until: (1) no more supported queries can be found or (2) no more supported queries can be found that pass e).

6. The system of claim 5, wherein the processor is further configured to send to the client the URLs of the group as a stream by being configured to:
establish a network connection with the client;
stream the URLs of the group on the network connection; then
close the network connection.

7. The system of claim 6, wherein the network connection is a HTTP connection.

8. The method of claim 1, wherein the thematic Web index is the index of a search-based application supporting queries related to a specific topic, and the structured query amounts to the disjunction of all the supported queries.

\* \* \* \* \*